(No Model.)
F. L. MILLER.
NUT LOCK.
No. 322,628. Patented July 21, 1885.
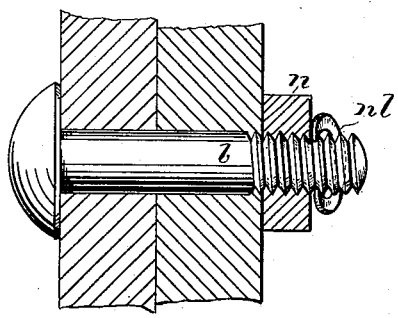
WITNESSES.
Jacob W. Loeper
Louis G. Ruth.
INVENTOR.
Frank L. Miller
By C. P. Jacobs
Atty.

UNITED STATES PATENT OFFICE.

FRANK L. MILLER, OF INDIANAPOLIS, INDIANA, ASSIGNOR OF ONE-HALF TO GLENWOOD PREBLE, OF SAME PLACE.

NUT-LOCK.

SPECIFICATION forming part of Letters Patent No. 322,628, dated July 21, 1885.

Application filed December 29, 1884. (No model.)

*To all whom it may concern:*

Be it known that I, FRANK L. MILLER, a resident of Indianapolis, Indiana, have made certain new and useful Improvements in Nut-Locks, a description of which is set forth in the following specification, reference being made to the accompanying drawings, in the several figures of which like letters indicate like parts.

My invention belongs to that class of devices known as "nut-locks," and is designed to be driven down upon the threads of the bolt in front of the nut, after the latter has been set at the right point to prevent the nut from turning or becoming loose upon the bolt, and will be understood from the following description.

In the drawings, Figure 1 is a view of a bolt passing through a couple of boards with a nut, and the nut-lock in place on the bolt, the boards and nut being in cross-section. Fig. 2 is an end view showing the lock entered upon the thread of the bolt, and Fig. 3 is a front view showing the shape of the lock as stamped from the sheet of steel.

In detail, *nl* is the lock-piece, and is made from a piece of sheet steel, one arm a little longer than the other, the opening O being cut in horseshoe shape, so that the points *p* are drawn in slightly toward each other. *b* is the bolt, and *n* is the nut. When the nut has been screwed up as tight as desired, the lock-piece is driven down in front of the nut astride the bolt in such manner that one arm of the lock-piece presses close against the turning-off side of the nut, and in a manner wedges it down, while the other arm of the lock-piece is at the distance of one thread's width from the other side of the nut. The wedged arm prevents the nut from turning off or getting loose, while the other arm of the lock-piece, being free from contact with the nut, is not liable to be carried round on the thread by any movement of the nut.

The nut and lock-piece are shown in proper relative position in Fig. 2. The longer arm of the lock-piece is the one which must bear against the nut, as it gives a longer bearing in the thread of the bolt. It will be found that when the points of the lock-piece pass the center of the bolt they will spring toward each other, thus holding the lock-piece firmly in place.

What I claim, and desire to secure by Letters Patent, is the following:

1. The lock-piece *nl*, having opening *o* and arms *p*, one of these arms being slightly longer than the other, and the distance between the points of the arms less than the central diameter of the opening, substantially as described.

2. A nut-lock composed of a flat circular segment-plate, one of whose ends is slightly longer than the other, and the distance between the two being slightly less than the diameter of the bolt measured inside the depth of the threads, substantially as described.

In witness whereof I have hereto set my hand this 18th day of December, 1884.

FRANK L. MILLER.

Witnesses:
C. P. JACOBS,
WM. E. BARTON.